US011593824B2

(12) United States Patent
Carroll et al.

(10) Patent No.: US 11,593,824 B2
(45) Date of Patent: Feb. 28, 2023

(54) SYSTEM AND METHOD FOR DOMAIN NAME VALUATION

(71) Applicant: VERISIGN, INC., Reston, VA (US)

(72) Inventors: William Carroll, Sterling, VA (US); Galileo Mark Namata, Alexandria, VA (US); Andrew Simpson, Sterling, VA (US); Scott Walker, Purcellville, VA (US)

(73) Assignee: VeriSign, Inc., Reston, VA (US)

( * ) Notice: Subject to any disclaimer, the term of this patent is extended or adjusted under 35 U.S.C. 154(b) by 186 days.

(21) Appl. No.: 15/672,664

(22) Filed: Aug. 9, 2017

(65) Prior Publication Data
US 2019/0050878 A1 Feb. 14, 2019

(51) Int. Cl.
*G06Q 30/02* (2012.01)
*G06Q 30/0201* (2023.01)
*G06Q 30/00* (2023.01)
*H04L 61/3015* (2022.01)
*G06Q 30/0601* (2023.01)
(Continued)

(52) U.S. Cl.
CPC ......... *G06Q 30/0206* (2013.01); *G06Q 30/00* (2013.01); *G06Q 30/0601* (2013.01); *H04L 61/302* (2013.01); *G06F 16/90332* (2019.01); *H04L 61/3025* (2013.01); *H04L 61/4511* (2022.05)

(58) Field of Classification Search
CPC .............. G06Q 30/0206; G06Q 30/00; G06Q 30/0601; H04L 61/302; H04L 61/3025; H04L 61/1511; G06F 16/90332
See application file for complete search history.

(56) References Cited

U.S. PATENT DOCUMENTS 9,058,393 B1 * 6/2015 Nicks ................. G06Q 30/0278
9,218,334 B2 12/2015 Mugali, Jr. et al.
(Continued)

OTHER PUBLICATIONS

Iparraguirre, J., "Evaluation and Economic Valorization of Websites Using the Technical Evaluation and Economic Valorization Methodology (ETVE)", SAI Computing Conference 2016,Jul. 13, 2016, pp. 725-733. (Year: 2016).*

(Continued)

*Primary Examiner* — James M Detweiler
(74) *Attorney, Agent, or Firm* — Baker Botts LLP; Michael A. Sartori

(57) ABSTRACT

A method and a computer system for performing the method of determining an initial value or lifetime value for a domain name is provided. The method for determining an initial value includes obtaining, over a communication network, a domain name from requestor; obtaining, over the communication network, one or more inputs from one or more domain name data sources; applying the one or more inputs and the domain name to an initial lifetime worth computer model, wherein the one or more inputs comprise data related to comparable historical domain names, data from a linguistic model analysis, data from a linguistic frequency list, and data related to a second-level domain to top-level domain relationship analysis; determining, by a hardware processor, an initial lifetime worth for the domain name based on the initial lifetime worth computer model; and providing the initial lifetime worth for the domain name to the requestor.

17 Claims, 4 Drawing Sheets

(51) Int. Cl.
    *H04L 61/4511*     (2022.01)
    *G06F 16/9032*     (2019.01)

(56)              References Cited

U.S. PATENT DOCUMENTS

| | | | |
|---|---|---|---|
| 10,984,489 B1* | 4/2021 | Bruce | G06N 20/00 |
| 2008/0262878 A1* | 10/2008 | Webby | G06Q 10/02 |
| | | | 705/5 |
| 2009/0254545 A1 | 10/2009 | Fisken | |
| 2010/0058210 A1* | 3/2010 | Johnson | G06Q 30/0241 |
| | | | 715/764 |
| 2012/0084281 A1* | 4/2012 | Colosi | H04L 61/302 |
| | | | 707/723 |
| 2014/0379638 A1* | 12/2014 | Li | G06F 16/27 |
| | | | 707/610 |
| 2016/0196346 A1* | 7/2016 | Kamdar | G06F 16/9535 |
| | | | 705/26.1 |
| 2017/0186061 A1* | 6/2017 | Minardos | H04L 61/302 |

OTHER PUBLICATIONS

European Search Report in EP Application No. 18188031 dated Dec. 19, 2018, 11 pages.
Iparraguirre, J., "Evaluation and Economic Valorization of Websites Using the Technical Evaluation and Economic Valorization Methodology (ETVE)", SAI Computing Conference 2016, Jul. 13, 2016, pp. 725-733.

* cited by examiner

SYSTEM AND METHOD FOR DOMAIN NAME VALUATION

FIELD

This disclosure relates generally to determining a value for a domain name.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources including web pages using names.

The DNS uses "resource records", which are persistently stored, formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. The registrar chosen by the registrant asks the registrant to provide various contact and technical information that makes up the registration. The registrar then keeps a record of the contact information and submits the technical information to the registry. For ease of discussion, a registrar is identified with its hardware computer servers unless otherwise specified or clear from context. Further, an internet user has a hardware client computer. For ease of discussion, a registrant is identified with its hardware client computer unless otherwise specified or clear form context.

SUMMARY

In accordance with examples of the present disclosure, a method of determining an initial value for a domain name is provided. The method comprises obtaining, over a communication network, a domain name from requestor; obtaining, over the communication network, one or more inputs from one or more domain name data sources; applying the one or more inputs and the domain name to an initial lifetime worth computer model, wherein the one or more inputs comprise data related to comparable historical domain names, data from a linguistic model analysis, data from a linguistic frequency list, and data related to a second-level domain to top-level domain relationship analysis; determining, by a hardware processor, an initial lifetime worth for the domain name based on the initial lifetime worth computer model; and providing the initial lifetime worth for the domain name to the requestor.

In some examples, the method can further comprise determining that the domain name is not currently registered. In some examples, the method can further comprise providing an offer to register the domain name. In some examples, the one or more data sources comprise a DNS server, a DNS registrar, and an existing domain name database. In some examples, the method can further comprise applying a weighting factor to a numerical representation of each of the data sources.

In some examples, the initial lifetime worth is determined by:

$$f_{initiallifetimeworth}(d) = \sum_{i=0}^{K} w_i a_i$$

where
d: domain name;
K: is a number of attributes of that domain based on the one or more inputs;
$w_i$: is a weight of a specific attribute with index I; and
$a_i$: is a numeric representation of an attribute with index i.

In accordance with examples of the present disclosure, a method of determining a lifetime value for a domain name is provided. The method comprises obtaining, over a communication network, a domain name from requestor; obtaining, over the communication network, one or more inputs from one or more domain name data sources; applying the one or more inputs and the domain name to a lifetime worth computer model, wherein the one or more inputs comprise data related to registrant information, technical sophistication of a domain hosting infrastructure, web page content structure, technology used, registrant engagement, cost of ownership, traffic associated with the domain name; determining, by a hardware processor, a lifetime worth for the domain name based on the lifetime worth computer model; and providing the lifetime worth for the domain name to the requestor.

In some examples, the method can further comprise determining that an expiration period for domain name within a renewal period. In some examples, the method can further comprise providing an offer to renew the registration for the domain name. In some examples, the one or more data sources can comprise a DNS server, a DNS registrar, and an existing domain name database. In some examples, the method can further comprise applying a weighting factor to a numerical representation of each of the data sources.

In some examples, the lifetime worth is determined by:

$$f_{lifetimeworth}(d) = \sum_{i=0}^{K} w_i a_i$$

where
d: domain name;
K: is a number of attributes of the domain name based on the one or more inputs;
$w_i$: is a weight of a specific attribute with index I;

$a_i$: is a numeric representation of an attribute with index I.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Generally speaking, examples of the present disclosure describe methods and systems configured to execute the methods for determining the maximum intrinsic value of a domain name. The maximum intrinsic value includes both the value prior to registration and continuing to know the intrinsic value after registration. The method includes constructing a model to compare linguistic structure to existing domain, grouping domain names into portfolios and purposes, identifying relationships between the language scripts, and leveraging crawl information including metadata and content to assess technical sophistication. The disclosed methods allow for a means to determine a domain's life time value to an entity, i.e., company, which allows for a better prediction of renewals and better pricing on domain names within the new TLD's.

Figure 1:
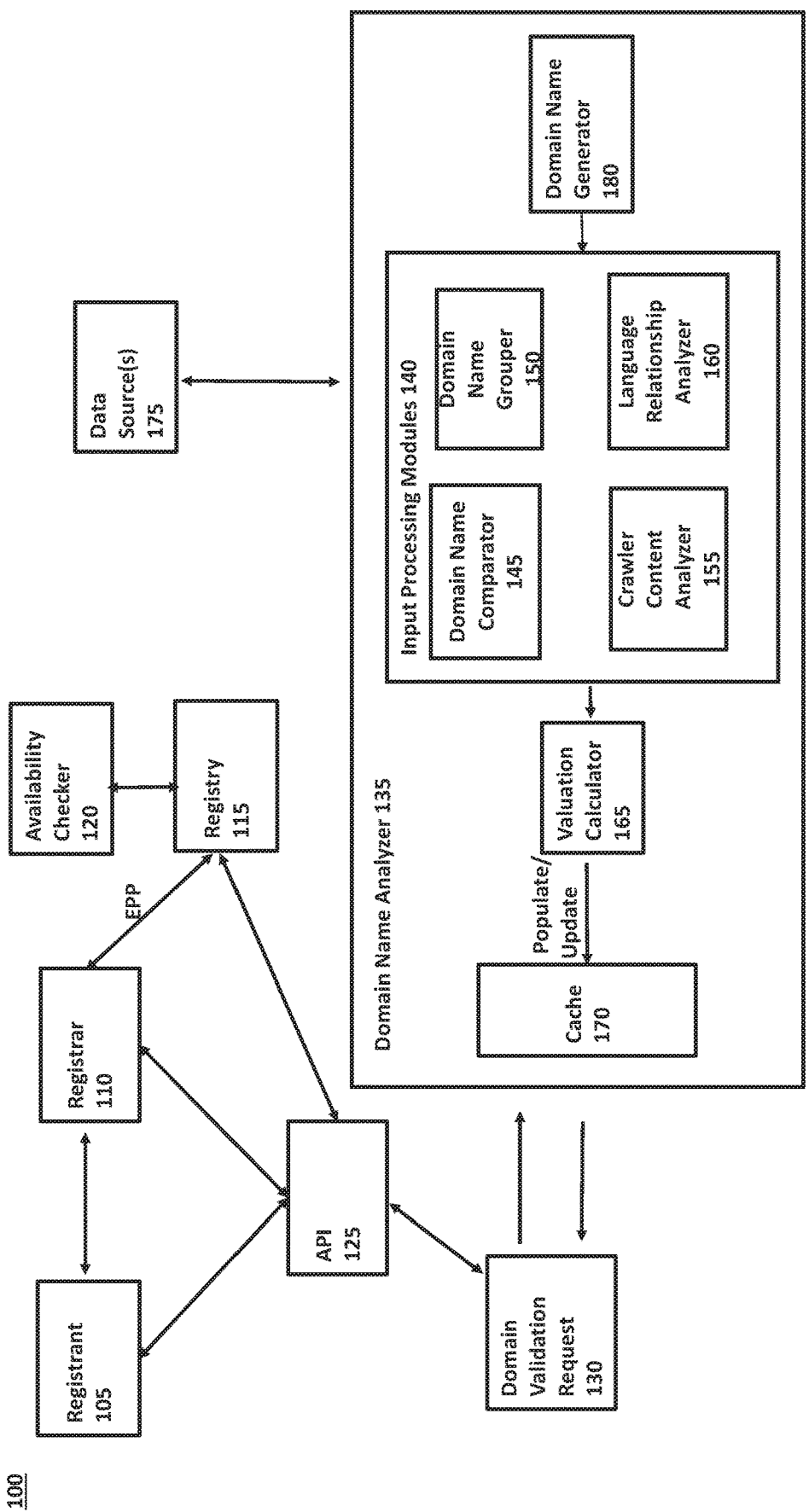
FIG. 1 shows a system 100 for determining a value for a domain name, according to examples of the present disclosure.

FIG. 1 shows a system 100 for determining a value for a domain name, according to examples of the present disclosure. In the system 100, a requestor, such as a registrant 105, submits a request, such as a domain validation request 130, to a domain name analyzer 135 to determine a value for a domain name over a network. In some examples, the domain name analyzer 135 can be provided as a service offered by a registrar 110, a registry 115, or by a third party provider. In the example where the domain name analyzer 135 is provided by the registry 115, the registrar 110 can communicate the request and can receive the response using a low latency provisioning protocol that enables near real time querying of the cost and availability of registration of the domain name. The registry 115 can check the availability of a domain name by submitting a request to an availability checker 120. In one example, the provisioning protocol can be the extensible provisioning protocol (EPP) as defined in RFC 5730. In the example where the domain name analyzer 135 is provided by a third party provider, the request and answer can be provided through an API 125. Non-EPP registrar requests may allow the registrar 110 to offer better real-time suggestions to the registrant 105. The provisioning protocol or the API can provide responses that meet or exceed a predefined service level agreement, such as responses answered under 100 ms or under 50 ms. In some examples, the registrant 105 and/or the registrar 110 can also specify additional information such as customer portfolio information type or size information that is not currently provided in an EPP request.

The domain name analyzer 135 can comprise input processing modules 140 including a domain name comparator 145, a domain name grouper 150, a crawler content analyzer 155, a language relationship analyzer 160, and a domain name generator 180. The input processing modules 140 can continuously or on a scheduled basis provide valuations for domain names. The outputs of the processing modules 140 are provided to a valuation calculator 165, which is described below with reference to Equations 1 and 2, which is then populated/updated into a cache 170. The cache 170 can store valuation information or valuation range information for domains analyzed by the input processing modules 140. By using this valuation process, a number of domains can be valued and stored in the cache 170 and ready to be provided to a requestor in near real time without having to perform the valuation for each received request. The analyzed domains can be provided with one or more flags, which can indicate that additional documentation is required, additional technical restrictions may be relevant, additional contractual restrictions may be relevant, usage suggestions, or suggested categories and services for the domain. The domain name analyzer 135 can communicate with one or more data sources 175, which can include information related to news, known domain name patterns, expiring domains, DNS requests, DNS traffic data, previous domain name valuation requests, and other related data sources. The domain name analyzer 135 can communicate with the registrant 105, the registrar 110, or the registry 115 over a network.

For ease of discussion, the registrar 110 and the registry 115 are identified with its hardware computer servers unless otherwise specified or clear from context. The registry 115 can be one or more DNS registries that can provide authoritative answers to one or more top-level domains. In some examples, the domain name analyzer 135 can be part of a service offered by and/or component of the registrar 110 or the registry 115. Further, an internet user has a hardware client computer. For ease of discussion, a requestor (e.g., registrant 105) is identified with the internet user's hardware client computer unless otherwise specified or clear form context.

In operation, the registrant 105 submits a query to the domain name analyzer 135 to determine a value for the domain name "example.com." The domain name analyzer 135 obtains the query and then can immediately return the valuation if it is in the cache. If it is not in the cache, a default value will be returned indicating that the value for a domain is not currently available.

The value of the domain name can be determined using the input processing modules 140, e.g., the domain name comparator 145, the domain name grouper 150, the crawler content analyzer 155, and the language relationship analyzer 160. The domain name analyzer 135 can also query one or more data sources, e.g., the data source(s) 115, the registrar 110, the registry 115, to request additional information that can be used in determining the value of the domain name. The domain name analyzer 135 can compute continuously or in a scheduled manner a value or value range for a number of domain names, which can then be provided to the cache 170. Responses to requestors can be then provided in a near real-time manner, such as within a time frame defined by a service level agreement parameter for a provisioning protocol (i.e., less than 100 ms or less than 50 ms). If a value or value range for a particular domain is not found in the cache 170, a response can be returned indicting that a value is not found or a default value can be provided. In some examples, slower than the near real-time response or offline evaluation can be performed. In this example, a domain can be submitted and its value can be computed offline by the domain name analyzer 135 and its value can then be provided to the requestor.

The domain name comparator 145 can compare the domain name being analyzed with other registered or previously registered similar type domain names. The domain name grouper 150 can compare the domain name being analyzed with other groups of registered or previously registered similar type domain names. The crawler content analyzer 155 can perform a web crawl to a plurality of on-line resources, i.e., current and/or archived web pages, to determine a number of occurrences and their context of the domain name being analyzed. The language relationship analyzer 160 can perform language-related services, including but are not limited to, translation, transliteration, graphene/phoneme analysis, logogram analysis, e.g., Chinese/Japanese/Korean, etc. conversion to Unicode, etc.

The domain name generator 180 can communicate with the data source(s) 175 to generate a set of likely requested domain names that can be evaluated by the domain name analyzer 135 to compute values or range of values. For example, the domain name generator 180 can analyze data from the variety of sources in the data source(s) 175 to create different combinations of characters and/or strings to produce domain names. In one example, if a particular trending topic if found in a data source, such a natural disaster, domain names that combine the location of the disaster and the nature of the disaster in various combinations can be produced and values of those domain names can be computed and provided to the cache 170.

In some examples, the domain name analyzer 135 can pre-calculate the values for domain names that can be identified as most likely to be queried by a requestor. Example sources for such domains where values can be pre-calculated include expiring domains, domains created from popular keywords (e.g., all dictionary term domain names), domains of a certain length (e.g., all possible domains of length 1-4), domains that match known popular patterns like <Adjective><Noun> (e.g., indoorfishpond.com), domains with high DNS traffic, domains consisting of proper names gathered via crawling, etc. Updates can occur in real-time, as domains are considered or re-considered based on incoming data (e.g., news, social media feeds, popular hash tags). Similarly, for domains that are queried for that are not found in the cache, values can be computed offline later and stored it in the cache for the next time it is queried.

In some examples, the cache 170 can be updated for all values periodically. In some examples, the cache 170 can be incrementally updated where the values are updated for domains most frequently requested most often from the API 125, domains receiving the most DNS traffic, domains whose keywords are highly occurring in some external data (e.g., news), etc. In some examples, the cache 170 can be updated incrementally based on major changes in data sources used as input to the input processing module (e.g., for updating domains whose DNS traffic has gone up significantly since the last value computation).

Figure 2:
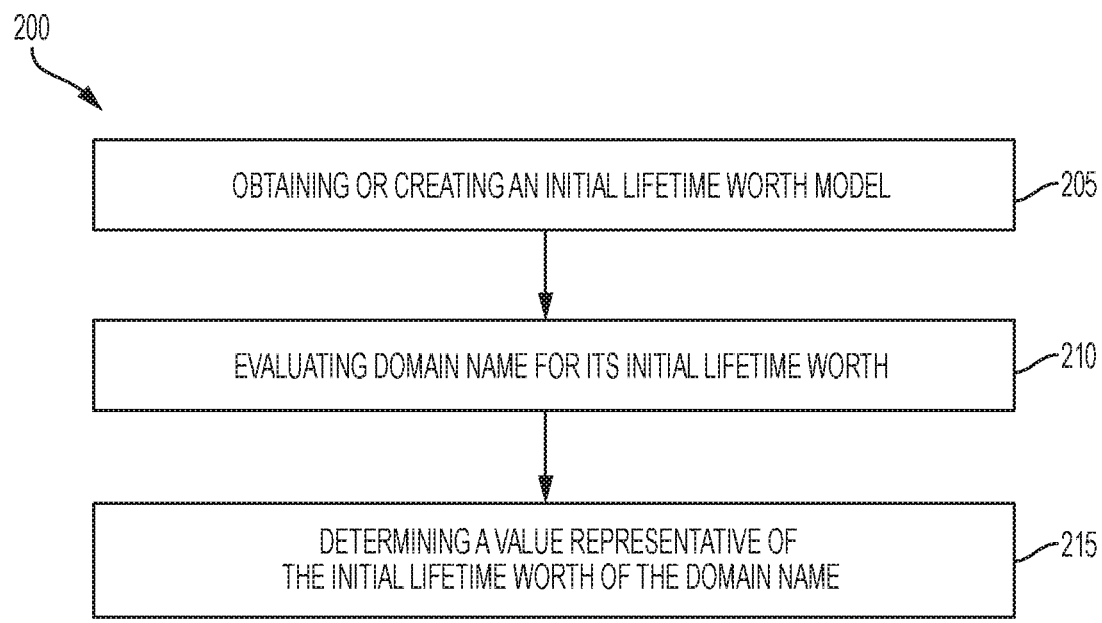
FIG. 2 shows a method for computing initial lifetime worth for a domain name 200, according to examples of the present disclosure.

FIG. 2 shows a method for computing initial lifetime worth for a domain name 200, according to examples of the present disclosure. The method begins by obtaining or creating an initial lifetime worth model 105. For example, the registrant 105 wishing to compute an initial lifetime value for a domain name may operate a client computer and activate a URL containing a domain name for a service provider, e.g., the domain name analyzer 135, that computes values for domain names. One example of a service provider is the registrar 110 where the user enters the URL, e.g., http://www.registrar.com, for the registrar 110 by entering it into the navigation field of a web browser executing on the client computer or by clicking on a link for the URL as it is displayed in the browser on a webpage or other internet resource. The registrar 110 can provide an interface with which the user can entered a domain name to be analyzed.

The initial lifetime worth model is based on a variety of inputs which can be processed using the one or more sub components, e.g., the domain name comparator 145, the domain name grouper 150, the crawler content analyzer 155, and the language relationship analyzer 160. For example, the inputs can include, but are not limited to, the following.

The inputs can include comparable historical domains (e.g., domains registered through the same registrar, domains registered by the same registrant, domains which share keywords in common with a domain, domains of the same length).

The inputs can include linguistic model analysis (e.g., domains registered through the same registrar, domains registered by the same registrant, domains which share keywords in common with a domain, domains of the same length).

The inputs can include linguistic frequency lists (e.g., how often the domain name leftmost label appears in a public corpus like Wikipedia, how often the domain name excluding the TLD appears in web content from a crawl of the Internet).

The inputs can include second-level domain leftmost label to top-level domain relationship. TLD's often have an associated semantic meaning associated with them. For example, the TLD ".VERISIGN" is semantically associated with the company Verisign and its business. Because Verisign is in the domain name industry, domain names in .VERISIGN associated with the domain name industry (e.g., domain.VERISIGN, registrars.VERISIGN) are likely to have a higher lifetime value because "domain" and "registrars" are associated with the company Verisign. Inversely, the domain names not directly associated with Verisign (e.g., clockrepair.VERISIGN, textiles.VERISIGN) and are likely to have comparatively lower lifetime values. A measure how related a second level domain is to the top level domain can be used by looking at how likely both are seen in published text. For example, for "domain.VERISIGN" can be measured as how many documents in some collection of documents (e.g., Wikipedia articles, individual web pages from web crawling) contain the words "domain" and "VERISIGN".

The domain name can be represented as a string of character and the string of characters can be divided into one or more subsets of strings that can be analyzed. The one or more subsets of string can be divided based on, but are not limited to the following: the number of distinct keywords found in the subset, whether the keywords are found in a dictionary including the number of keywords found, a length of each subset and whether numerals are found in the subset including the number of numerals found. Each subset can be compared against a corpus of registered and/or previously registered domain names, e.g. the data source(s) 175. If one or more of the subset is the same or similar to the registered and/or previously registered domain names found in the corpus, a higher value can be assigned to each subset than would be assigned if no match is found in the corpus. Each subset can also be analyzed using a linguistic model analysis where the part of speech (such as noun, plural noun, verb, adjective, etc., possibly considering if the domain is a one word domain) and/or the relationship of vowels and consonants can be analyzed. Each subset can also be analyzed using a linguistic frequency lists. Each subset can also be analyzed using a second-level domain to top-level domain relationship.

At 210, a domain name to be evaluated for its initial lifetime worth is obtained. One way to compute the initial lifetime worth is a weighted linear combination of the attribute values of the specific domain tied to gathered input regarding comparable domains, linguistic analysis, linguistic frequency, etc.

The initial lifetime worth (d) can be determined according to the below equation $$f_{initiallifetimeworth}(d) = \sum_{i=0}^{K} w_i a_i \quad (1)$$

where d: domain name, K: is the number of attributes of that domain based on the gathered input (i.e., If, after research, 4 attributes are used, K=3 to support attributes $a_0, a_1, a_2, a_3$), $w_i$: is the weight of a specific attribute with index i (The value of the weights can be any numeric value. The values can be set manually, i.e., can be set it to a value based on a subject matter expert's opinion of what it should be or can be set by trying to learn it from labeled data using standard machine learning techniques such as linear regression. The range of this value will depend on what the value of the attribute this weight is used with, as well as what the subject matter expert or machine learning algorithm chooses to use), $a_i$: is the numeric representation of an attribute with index i (The attribute value is defined by what the value is for a particular domain name. For example, if the attribute value is the full length of a domain name, a domain like verisign.com would have a value of 8 since "verisign.com" is a 12 character string. If the attribute value of a domain indicates how often the label of a domain name appears in a document collection (e.g., Wikipedia articles), a domain like "verisign.com" may have the value of 4,400 because it is found that the label "verisign" appeared 4,400 times in that document collection. The range of this value will depend on what the value is).

Examples of $a_i$ include $a_0$: Length of domain name, $a_1$: Average number of years domains from the same registrar as d are renewed, $a_2$: Number of appearance of the SLD in a text corpus, . . . , $a_K$: Numeric score to represent the "pronounceability" of the second-level domain (SLD) name.

The weights ($w_0, w_1, . . . , w_K$) can be manually or automatically set based on historical domain registration data.

At 215, a value representative of the initial lifetime worth of the domain name is outputted. In some example, the domain name analyzer 135, in conjunction with the registrar 110 and/or registry 115, can determine whether the domain name is currently registered, for example using the availability checker 120. If the domain name is available to be registered, the domain name analyzer 135 can provide an offer to register the domain name. If the domain name analyzer 135 is separate from the registrar 110, the domain name analyzer 135 can provide a link or a redirection to the registrar 110 or another DNS registrar where the registrant 105 may register the domain name using known domain name registration procedures.

Below is an example of an initial lifetime worth valuation for "verisign.com" based on the criteria discussed above. The initial lifetime worth (d) for verisign.com can be determined by $$f_{initiallifetimeworth}(d) = \sum_{i=0}^{K} w_i a_i$$

where d: verisign.com. K=3 corresponding to attributes: $a_0, a_1, a_2, a_3$. $a_0$ corresponds to the length of domain name. For this example, this is defined as the string length of the full string "verisign.com" which is 12. $a_1$ corresponds to the average number of years domains from the same registrar as d are renewed. This can be computed from information based on archival registration and renewal records for registrars. For this example, it will be assumed that the value of this for "verisign.com" registrar is 10. $a_2$ corresponds to the number of appearances of the SLD leftmost label in a text corpus. This value can be computed by looking at the number of times a domain name appears in a text corpus like Wikipedia articles, raw HTML content from crawling the Internet, newspaper articles, etc. For this example, it is assumed it is the number of Wikipedia articles that contain the second level domain label "verisign" and assume it appears 4,400 times. $a_3$ corresponds to a numeric score to represent the "pronounceability" of the domain name. In some examples, pronounceability can be determined as described in U.S. Pat. No. 9,218,334 titled "Pronounceable Domain Names," which is commonly owned by the present applicant and is hereby incorporated by reference in its entirety. As described in this US patent, pronounceability can be determined based on phonetic model and/or a character order model. The phonetic model can be built by preparing a library of source words comprising pronounceable words and non-pronounceable words and providing the library of source words to a learning model algorithm, i.e., a Bayesian network, to train the learning model algorithm to determine characteristics of pronounceable and characteristics of non-pronounceable words. The character order model can be built by preparing a library of source words comprising pronounceable and non-pronounceable words and associating attributes of pronounceable source words and attributes of non-pronounceable source words with words in the library of source words. Attributes of the pronounceable word and non-pronounceable words can include, but are not limited to, a n-gram score. For this example, it is assumed that previously defined algorithm has assigned "verisign.com" a score of 8. Weights ($w_0, w_1, w_2, w_3$) can be manually or automatically set based on historical domain registration data. In this example, a weight is manually assigned based as follows: $w_0$: −10, 20, $w_1$: 20, $w_2$: 0.05, $w_3$: 200.

Therefore, based on the above, $$f_{initiallifetimeworth}(verisign.com) =$$
$$\sum_{i=0}^{K=3} w_i a_i = w_0 a_0 + w_1 a_1 + w_2 a_2 + w_3 a_3 = (-10 \times 12) + (20 \times 10) +$$
$$(0.05 \times 4400) + (200 \times 8) = -120 + 200 + 220 + 800 = 1100.$$

In some examples, the initial lifetime value of a domain name may be output in a variety of ways. According to some embodiments, the initial lifetime value of a domain name is output by being displayed on a computer monitor. According to some embodiments, the initial lifetime value of a domain name is output by being emailed to a selected email address. According to some embodiments, the initial lifetime value of a domain name is output by presenting them to a user for registration. Such embodiments may be implemented by, or in coordination with a registrar or registry, which can implement the registration process. Such embodiments may present the user with a graphical user interface by which the user may select the domain name and register it using the same interface. The registration may be accomplished using standard domain name registration techniques.

Figure 3:
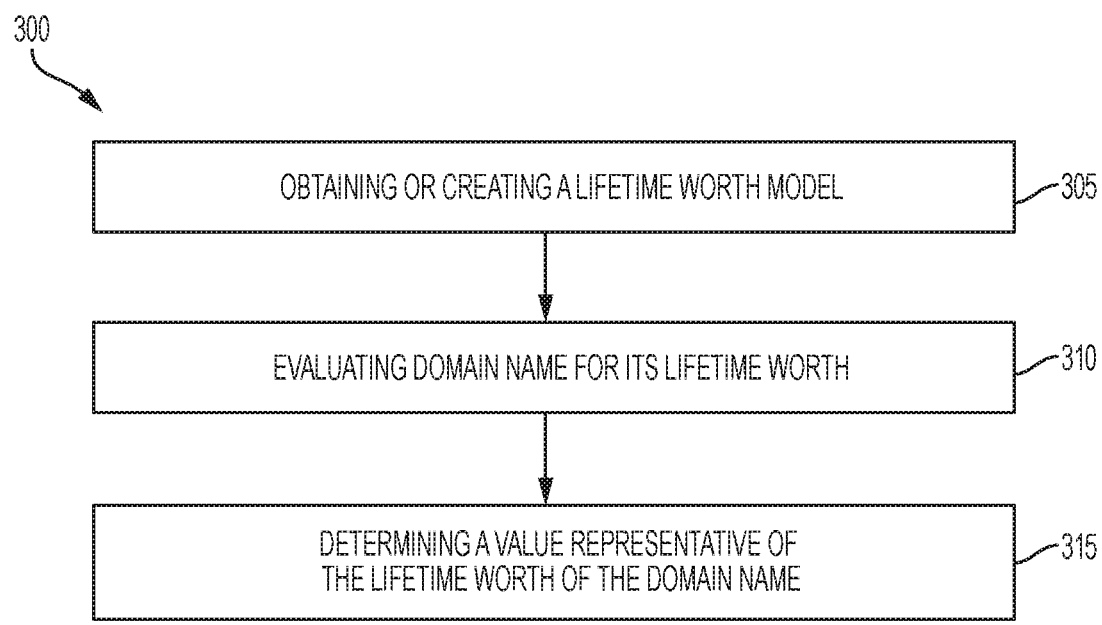
FIG. 3 shows a method for computing a lifetime worth for a domain name 300, according to examples of the present disclosure.

FIG. 3 shows a method for computing a lifetime worth for a domain name 300, according to examples of the present disclosure. The method begins by obtaining or creating a lifetime worth model 305. The lifetime worth model 305 is based on a variety of inputs. For example, the inputs can include, but are not limited to, registrant information; technical sophistication of domain hosting infrastructure, web page content structure used technologies, etc.; registrant engagement; cost of ownership; traffic; external references; other inputs.

At 310, a domain name to be evaluated for its lifetime worth is obtained. One way to compute the lifetime worth is a weighted linear combination in a similar fashion as the initial lifetime worth but with additional attribute values of the specific domain tied gathered input regarding to domain name usage, DNS activity, etc. The lifetime worth (d) can be determined based on the following:

$$f_{lifetimeworth}(d) = \sum_{i=0}^{K} w_i a_i \quad (2)$$

where d corresponds to a domain name, K corresponds to the number of attributes of that domain based on the gathered input, $w_i$ corresponds to the weight of a specific attribute with index i, and $a_i$ corresponds to the numeric representation of an attribute with index i.

Examples of $a_i$ include: $a_0$: number of domains owned by the registrant of d, $a_1$: numeric score representing the level of technology used in developing and running the associated web content, $a_2$: Number of times the web content of a domain changed in the first 30 days, . . . , $a_K$: Number of DNS queries to domain d in the first 30 days. Weights ($w_0$, $w_1$, . . . , $w_K$) can be manually or automatically set based on historical domain registration data.

At 315, a value representative of the lifetime worth of the domain name is outputted. In some example, the domain name analyzer 135, in conjunction with the registrar 110 and/or the registry 115, can determine whether the domain name is currently available to be renewed. If the domain name is available to be renewed, the domain name analyzer 135 can provide an offer to renew the registration of the domain name. If the domain name analyzer 135 is separate from the registrar 110, the domain name analyzer 135 can provide a link or a redirection to the registrar 110 or another DNS registrar where the registrant 105 may renew the registration of the domain name using known domain name registration renewal procedures.

Below is an example of a lifetime worth valuation for "verisign.com" based on the following:

$$f_{lifetimeworth}(d) = \sum_{i=0}^{K} w_i a_i$$

where d: verisign.com and K=3 corresponding to attributes: $a_0$, $a_1$, $a_2$, $a_3$. $a_0$ corresponds to the number of domains owned by the registrant of d. For this example, it is assumed that the owners of "verisign.com" own 100 domains, so $a_0$=100. $a_1$ corresponds to the numeric score representing the level of technology used in developing and running the associated web content. For this example, "verisign.com" will be assigned a technology usage value of 10, so $a_1$=10. $a_2$ corresponds to the number of times the web content of a domain changed in the first 30 days. For this example, "verisign.com" was changed only once during the first 30 days, so $a_2$=1. $a_3$ corresponds to the number of DNS queries to domain d in the first 30 days. For this example, it is assumed that 500,000 DNS queries were made for "verisign.com" during the first 30 days, so $a_3$=500000. Weights ($w_0$, $w_1$, $w_2$, $w_3$) can be manually or automatically set based on historical domain registration data. In this example, weights are manually assigned based as follows: $w_0$: 50, $w_1$: 25, $w_2$: −200, and $w_3$: 0.001. Therefore the lifetime value can be determined as $$f_{lifetimeworth}(verisign.com) =$$
$$\sum_{i=0}^{K=3} w_i a_i = w_0 a_0 + w_1 a_1 + w_2 a_2 + w_3 a_3 = (50 \times 100) + (25 \times 10) +$$
$$(-200 \times 1) + (0.001 \times 500000) = 5000 + 250 + -200 + 500 = 5500.$$

In some examples, the lifetime value of a domain name may be output in a variety of ways. According to some embodiments, the lifetime value of a domain name is output by being displayed on a computer monitor. According to some embodiments, the lifetime value of a domain name is output by being emailed to a selected email address. According to some embodiments, the lifetime value of a domain name is output by presenting them to a user for registration or renewal. Such embodiments may be implemented by, or in coordination with a registrar or registry, which can implement the registration or renewal process. Such embodiments may present the user with a graphical user interface by which the user may select the domain name and register or renew it using the same interface. The registration or renewal may be accomplished using standard domain name registration or renewal techniques.

By using the above-described features, a registry and/or registrar may see an increase in the registration or renewal rates by increasing or reducing prices for domains depending on predicted initial and overall lifetime value. For example, pricing for domains with a high lifetime value can be increased with the expectation that such domains are going to be in high demand and will be purchased even at the higher price. Inversely, a registry or registrar may want to decrease renewal pricing for domains with low lifetime value with the goal of encouraging registrants to retain their domains.

Figure 4:
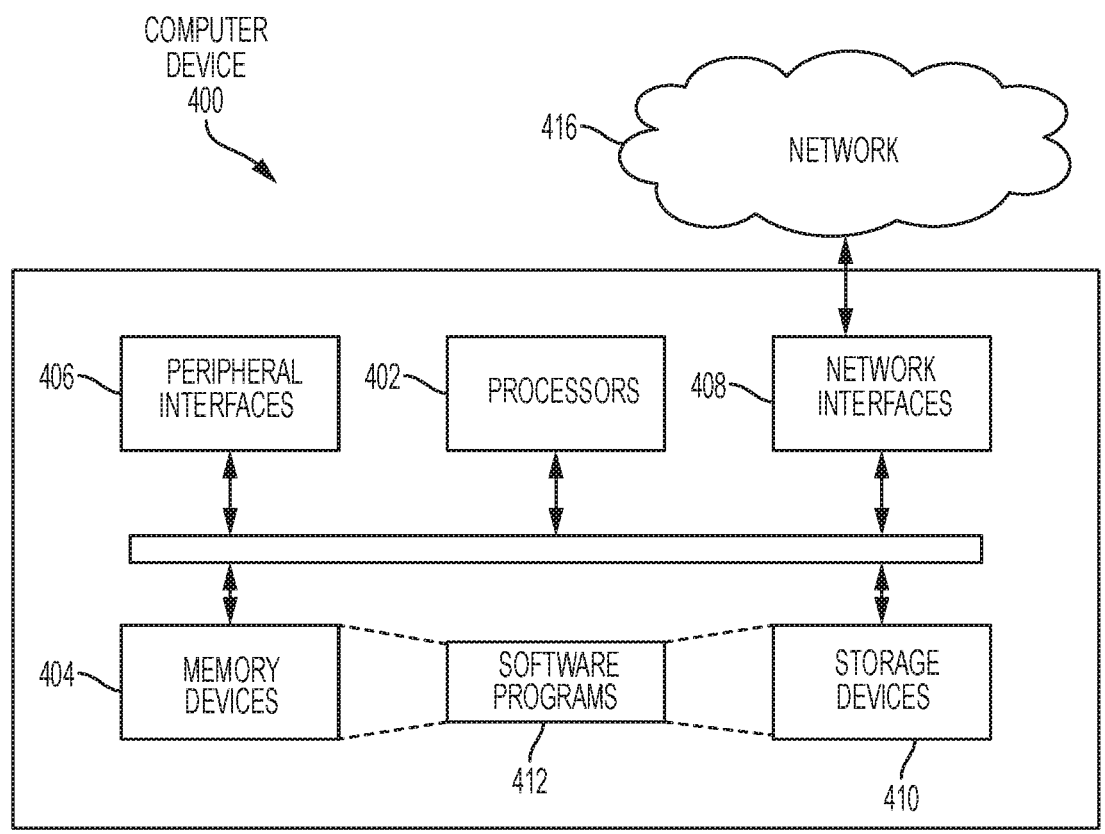
FIG. 4 illustrates an example of a hardware configuration for a computer device 400 that can be used as mobile device or server, which can be used to perform one or more of the processes described above.

FIG. 4 illustrates an example of a hardware configuration for a computer device 400 that can be used as mobile device or server, which can be used to perform one or more of the processes described above. While FIG. 4 illustrates various components contained in the computer device 400, FIG. 4 illustrates one example of a computer device and additional components can be added and existing components can be removed.

The computer device 400 can be any type of computer devices, such as desktops, laptops, servers, DNS servers (e.g., the registry 115, the registrar 110, the registrant 105), the domain name analyzer 135, etc., or mobile devices, such as smart telephones, tablet computers, cellular telephones, personal digital assistants, etc. As illustrated in FIG. 4, the computer device 400 can include one or more processors 402 of varying core configurations and clock frequencies. The computer device 400 can also include one or more memory devices 404 that serve as a main memory during the operation of the computer device 400. For example, during operation, a copy of the software that supports the DNS operations can be stored in the one or more memory devices 404. The computer device 400 can also include one or more peripheral interfaces 406, such as keyboards, mice, touchpads, computer screens, touchscreens, etc., for enabling human interaction with and manipulation of the computer device 400.

The computer device 400 can also include one or more network interfaces 408 for communicating via one or more networks, such as Ethernet adapters, wireless transceivers, or serial network components, for communicating over wired or wireless media using protocols. The computer device 400 can also include one or more storage device 410 of varying physical dimensions and storage capacities, such as flash drives, hard drives, random access memory, etc., for storing data, such as images, files, and program instructions for execution by the one or more processors 402.

Additionally, the computer device 400 can include one or more software programs 412 that enable the functionality described above. The one or more software programs 412 can include instructions that cause the one or more processors 402 to perform the processes described herein. Copies of the one or more software programs 412 can be stored in the one or more memory devices 404 and/or on in the one or more storage devices 410. Likewise, the data used by one or more software programs 412 can be stored in the one or more memory devices 404 and/or on in the one or more storage devices 410.

In implementations, the computer device 400 can communicate with other devices via a network 416. The other devices can be any types of devices as described above. The network 416 can be any type of electronic network, such as a local area network, a wide-area network, a virtual private network, the Internet, an intranet, an extranet, a public switched telephone network, an infrared network, a wireless network, and any combination thereof. The network 416 can support communications using any of a variety of commercially-available protocols, such as TCP/IP, UDP, OSI, FTP, UPnP, NFS, CIFS, AppleTalk, and the like. The network 416 can be, for example, a local area network, a wide-area network, a virtual private network, the Internet, an intranet, an extranet, a public switched telephone network, an infrared network, a wireless network, and any combination thereof.

The computer device 400 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 400 as described above need not be enclosed within a single enclosure or even located in close proximity to one another. Those skilled in the art will appreciate that the above-described componentry are examples only, as the computer device 400 can include any type of hardware componentry, including any necessary accompanying firmware or software, for performing the disclosed implementations. The computer device 400 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method of determining an initial value for a domain name, the method comprising:
    identifying, based on data from one or more data sources, a keyword;
    generating a list of domain names based on the keyword, wherein domain names of the list of domain names each correspond to a combination of the keyword with another word or other identified keyword;
    obtaining, over a communication network, one or more inputs from one or more domain name data sources, wherein the one or more inputs comprise data related to comparable historical domain names, data from a linguistic model analysis, data from a linguistic frequency list, data related to a second-level domain to top-level domain relationship analysis, or a combination thereof;
    applying the one or more inputs and the domain names of the list of domain names to an initial lifetime worth computer model, wherein the initial lifetime worth computer model comprises one or more attributes;
    determining, by a hardware processor, and based on the initial lifetime worth computer model, an initial lifetime worth for each domain name of the list of domain names, wherein the initial lifetime worth computer model is configured to apply individual weighting to the one or more attributes to determine the initial lifetime worth for each domain name of the list of domain names;
    storing, in a memory, the initial lifetime worth for each of the domain names of the list of domain names;
    obtaining, over the communication network and from a requestor, a first query, wherein the first query includes a first domain name;
    in response to the first query:
        accessing the domain names of the list of domain names;
        comparing the first domain name with the domain names of the list of domain names, and based on the comparing, identifying the initial lifetime worth of the first domain name;
        providing the identified initial lifetime worth for the first domain name to the requestor;
    updating, based on a change to the one or more inputs, the initial lifetime worth for the first domain name;
    storing the updated initial lifetime worth for the first domain name in the memory; and
    in response to a second query that includes the first domain name, retrieving the updated initial lifetime worth for the first domain name from the memory and providing the updated initial lifetime worth for the first domain name to the requestor or to a different requestor without determining a new initial lifetime worth for the first domain name.

2. The method of claim 1, further comprising providing an offer to register the first domain name.

3. The method of claim 1, wherein the one or more domain name data sources comprise one or more of: a DNS server, a DNS registrar, and/or an existing domain name database.

4. The method of claim 1, further comprising applying a weighting factor to a numerical representation of each of the domain name data sources.

5. The method of claim 1, wherein the initial lifetime worth is determined by:

$$f_{initiallifetimeworth}(d) = \sum_{i=0}^{K} w_i a_i$$

where
- d: domain name;
- K: is a number of the one or more attributes of that domain based on the one or more inputs;
- $w_i$: is a weight of an attribute from the one or more attributes with index i; and
- $a_i$: is a numeric representation of the attribute from the one or more attributes with index i.

6. The method of claim 1, further comprising updating the initial lifetime worth for the first domain name on a scheduled basis.

7. The method of claim 1, further comprising updating the initial lifetime worth for the first domain name periodically.

8. The method of claim 1, wherein identifying the keyword comprises: identifying a plurality of keywords based on data from the one or more data sources, wherein the data includes data representing a pattern, an expiring domain name, a DNS request, a DNS traffic data, and/or a previous domain name valuation request.

9. A computer system comprising:
one or more electronic processors;
a memory;
a non-transitory computer readable medium storing instructions that when executed by the one or more electronic processors executes a method of determining an initial value for a domain name, the method comprising:
identifying, based on data from one or more data sources, a keyword;
generating a list of domain names based on the keyword, wherein domain names of the list of domain names each correspond to a combination of the keyword with another word or other identified keyword;
obtaining, over a communication network, one or more inputs from one or more domain name data sources, wherein the one or more inputs comprise data related to comparable historical domain names, data from a linguistic model analysis, data from a linguistic frequency list, data related to a second-level domain to top-level domain relationship analysis, or a combination thereof;
applying the one or more inputs and the domain names of the list of domain names to an initial lifetime worth computer model, wherein the initial lifetime worth computer model comprises one or more attributes;
determining, based on the initial lifetime worth computer model, an initial lifetime worth for each domain model of the list of domain names, wherein the initial lifetime worth computer model is configured to apply individual weighting to the one or more attributes to determine the initial lifetime worth for each domain name of the list of domain names;
storing, in a memory, the initial lifetime worth for each of the domain names of the list of domain names;
obtaining, over the communication network and from a requestor, a first query, wherein the first query includes a first domain name;
in response to the first query:
accessing the domain names of the list of domain names,
comparing the first domain name with the domain names of the list of domain names, and based on the comparing, identifying the initial lifetime worth of the first domain name;
providing the identified initial lifetime worth for the first domain name to the requestor;
updating, based on a change to the one or more inputs, the initial lifetime worth for the first domain name;
storing the updated initial lifetime worth for the first domain name in the memory; and
in response to a second query that includes the first domain name, retrieving the updated initial lifetime worth for the first domain name from the memory and providing the updated initial lifetime worth for the first domain name to the requestor or to a different requestor without determining a new initial lifetime worth for the first domain name.

10. The computer system of claim 9, wherein the one or more electronic processors are further operable to perform the method comprising determining that the first domain name is not currently registered.

11. The computer system of claim 10, wherein the one or more electronic processors are further operable to perform the method comprising providing an offer to register the first domain name.

12. The computer system of claim 9, wherein the one or more domain name data sources comprise one or more of: a DNS server, a DNS registrar, and/or an existing domain name database.

13. The computer system of claim 9, wherein the one or more electronic processors are further operable to perform the method comprising applying a weighting factor to a numerical representation of each of the domain name data sources.

14. The computer system of claim 9, wherein the initial lifetime worth is determined by:

$$f_{initiallifetimeworth}(d) = \sum_{i=0}^{K} w_i a_i$$

where
- d: domain name;
- K: is a number of the one or more attributes of that domain based on the one or more inputs;
- $w_i$: is a weight of an attribute of the one or more attributes with index i; and
- $a_i$: is a numeric representation of the attribute of the one or more attributes with index i.

15. The computer system of claim 9, wherein the one or more electronic processors are further operable to perform the method comprising updating the initial lifetime worth for the first domain name on a scheduled basis.

16. The computer system of claim 9, wherein the one or more electronic processors are further operable to perform the method comprising updating the initial lifetime worth for the first domain name periodically.

17. The computer system of claim 9, wherein identifying the keyword comprises: identifying a plurality of keywords based on data from the one or more data sources, wherein the data includes data representing a pattern, an expiring domain name, a DNS request, a DNS traffic data, and/or a previous domain name valuation request.

* * * * *